US 11,287,863 B2

(12) United States Patent
Kennedy et al.

(10) Patent No.: US 11,287,863 B2
(45) Date of Patent: Mar. 29, 2022

(54) FUEL CELL POWER MANAGEMENT

(71) Applicant: Google LLC, Mountain View, CA (US)

(72) Inventors: James Kennedy, San Jose, CA (US); Christopher Gregory Malone, Mountain View, CA (US)

(73) Assignee: Google LLC, Mountain View, CA (US)

( * ) Notice: Subject to any disclaimer, the term of this patent is extended or adjusted under 35 U.S.C. 154(b) by 441 days.

(21) Appl. No.: 16/269,343

(22) Filed: Feb. 6, 2019

(65) Prior Publication Data

US 2020/0249734 A1     Aug. 6, 2020

(51) Int. Cl.
*G06F 1/26*     (2006.01)
*G05B 19/042*     (2006.01)

(52) U.S. Cl.
CPC ............. *G06F 1/26* (2013.01); *G05B 19/042* (2013.01); *G05B 2219/2639* (2013.01)

(58) Field of Classification Search
None
See application file for complete search history.

(56) References Cited

U.S. PATENT DOCUMENTS

| | | |
|---|---|---|
| 8,001,403 B2 | 8/2011 | Hamilton et al. |
| 9,436,258 B1 | 9/2016 | Lo et al. |
| 9,929,567 B2 | 3/2018 | Wang et al. |
| 9,939,834 B2 | 4/2018 | Bodas et al. |
| 2006/0184287 A1 | 8/2006 | Belady et al. |
| 2013/0253716 A1 | 9/2013 | Gross et al. |
| 2016/0013652 A1 | 1/2016 | Li et al. |
| 2017/0115720 A1 | 4/2017 | McKnight et al. |

OTHER PUBLICATIONS

PCT Invitation to Pay Fees in International Application No. PCT/US2019/057786, dated Jan. 29, 2020, 16 pages.
PCT International Search Report and Written Opinion in International Application No. PCT/US2019/057786, dated Apr. 1, 2020, 21 pages.

(Continued)

*Primary Examiner* — Sean Shechtman
(74) *Attorney, Agent, or Firm* — Fish & Richardson P.C.

(57) ABSTRACT

Methods, systems, and apparatus, including computer programs encoded on a computer storage medium, for reducing variations in power consumption. In one aspect, a system includes a power controller communicatively coupled to a power source and a plurality of computing devices of an Information Technology (IT) stack electrically coupled to the power source. The controller configured to perform operations including monitoring variations in power consumption of the plurality of computing devices, determining, for the plurality of computing devices and based on the monitored power consumption, a power consumption profile for the plurality of computing devices that describes historical statistics of the power consumption, reducing variations in power consumed by the IT stack by adjusting performance of devices consuming power from the power source or adjusting which devices in the IT stack are consuming power from the power source based on a change in the power consumption and the power consumption profile.

24 Claims, 6 Drawing Sheets

(56) References Cited

OTHER PUBLICATIONS

'www.datacenterdynamics.com' [online] "Fueling the future," Sebastian Moss, Mar. 5, 2018, [retrieved on Feb. 6, 2019] Retrieved from Internet: URL<https://www.datacenterdynamics.com/analysis/fueling-the-future/> 9 pages.

Li "Fuel Cell Powered Datacenter Power Management," Available on or before Fall 2015 [retrieved on Jul. 4, 2018] Retrieved from Internet: URL< https://www.archive.ece.cmu.edu/~ece740/f15/lib/exe/fetch.php?media=proposal-yang.pdf> 3 pages.

Li et al. "SizeCap: Efficiently Handling Power Surges in Fuel Cell Powered Data Centers," IEEE International Symposium on High Performance Computer Architecture, Mar. 2016, 13 pages.

Zhao et al. "Fuel Cells for Data Centers: Power Generation Inches From the Server," Microsoft Research Technical Report MSR-TR-2014-37, 16 pages.

PCT International Preliminary Report on Patentability in International Application No. PCT/US2019/057786, dated Aug. 19, 2021, 14 pages.

FUEL CELL POWER MANAGEMENT

BACKGROUND

Data center facilities are often used by providers to deliver Internet services to users. A data center, such as a server farm, typically contains thousands of server processing devices. Within the data centers the processing devices are arranged in racks, and each rack may contain dozens of servers. Assuming the power required for a single rack may be in the order of 50 kW, and that there may be hundreds of racks in a data center, it is not uncommon for a data center to have a power requirement on the order of megawatts.

SUMMARY

This specification describes technologies relating to optimization of power consumption to minimize fluctuations in power draw when using a fuel cell power system that powers a load (e.g., industrial loads, data centers, server racks, etc.) by modifying the load powered by the fuel cell.

In general, innovative aspects of the subject matter described in this specification can be embodied in a system that includes a power source, an Information Technology (IT) stack electrically coupled to the power source, wherein the IT stack includes a plurality of computing devices, and a power controller communicatively coupled to the power source and the plurality of computing devices. The power controller is configured to perform operations including monitoring variations in power consumption of the plurality of computing devices, determining, for the plurality of computing devices and based on the monitored power consumption, a power consumption profile for the plurality of computing devices that describes historical statistics of the power consumption, reducing variations in power consumed by the IT stack by adjusting performance of devices consuming power from the power source or adjusting which devices in the IT stack are consuming power from the power source based on a change in the power consumption and the power consumption profile, including decreasing performance of the plurality of computing devices in response to a determination that power consumption of the plurality of computing devices will increase toward a peak consumption, and increasing performance of the plurality of computing devices in response to a determination that power consumption of the plurality of computing devices will decrease toward a valley consumption.

Other embodiments of these aspects include corresponding apparatus, methods, systems, and computer programs, configured to perform the actions of the methods, encoded on computer storage devices.

These and other aspects can each optionally include one or more of the following features. In some aspects, adjusting which devices in the IT stack are consuming power from the power source includes increasing a number of the devices in the IT stack that are consuming power from the power source as the power consumption of the plurality of computing devices decreases and decreasing the number of computing devices in the IT stack that are consuming power from the power source as the power consumption of the plurality of computing devices increases.

In some aspects, the power controller is further configured to perform operations including predicting an upcoming change in power consumption by the plurality of computing devices based on the power consumption profile, wherein adjusting the performance of devices consuming power begins prior to a time at which the upcoming change is predicted to start.

In some aspects, the power controller is further configured to perform operations including decreasing performance of the plurality of computing devices in response to a determination that a present consumption level of the plurality of computing devices is above a first threshold, and increasing performance of the plurality of computing devices in response to a determination that the present consumption level of the plurality of computing devices is below a second threshold.

In some aspects, the power source is a fuel cell.

In some aspects, the power consumption profile comprises a total power consumption level of the IT stack and a respective individual power consumption level for each respective computing device.

In some aspects, increasing the performance of the plurality of computing devices includes adding additional workload to at least some of the plurality of computing devices in the IT stack. In some aspects, increasing the performance of the plurality of computing devices comprises increasing a clock speed of at least some of the plurality of computing devices in the IT stack.

In some aspects, the system further includes an ancillary cooling system, where the power controller is further configured to perform operations including increasing an operating level of the ancillary cooling system when the power consumption of the plurality of computing devices decreases, and decrease an operating level of the ancillary cooling system when the power consumption of the plurality of computing devices increases.

In some aspects, the power controller is further configured to perform operations including monitoring characteristics of a fuel source of the power source, generating, based on the monitored characteristics of the fuel source, a historical supply profile of the fuel source, determining that a source anomaly of the fuel source or a backup power feed is occurring or will occur at a given time, and adjusting the power consumption of the IT stack based on the source anomaly. In some aspects, determining that the source anomaly of the fuel source is occurring or will occur at a given time includes determining that the level of the fuel source is below a power source threshold. In some aspects, the power source is a fuel cell, and monitoring characteristics of the fuel source includes monitoring a level of natural gas being provided to the fuel cell.

Particular embodiments of the subject matter described in this specification can be implemented so as to realize one or more of the following advantages. Fuel cells have several advantages as power sources for a data center. First, fuel cells have high energy efficiency. In addition, as a distributed power generator, fuel cells can be placed close to power consumers and thus avoid the energy losses in the long-distance power transmission. Second, fuel cells induce less environmental issues. For example, fuel cells can reduce carbon dioxide emissions of traditional power plants. Third, fuel cells have high energy source continuous reliability. This is because fuel delivery infrastructure is usually buried and thus robust to severe weather. Based on these advantages, fuel cells show promises as future data center power sources, but typical fuel cell systems require expensive energy storage (batteries) or complex electrical grid-connected architectures due to the inherent time lag for power anomalies. The subject matter described in this specification optimizes power consumption to reduce fluctuations in power draw required from the fuel cells to allow a fuel cell system to operate without the use of the expensive energy storage or complex electrical grid-connected architectures.

Fuel cells also have a potential distinct advantage over the alternating current grid in that they produce direct current (DC). An IT stack in the datacenter also ultimately uses DC. This has the potential to improve system efficiency through reduction of conversion steps, for instance AC to DC for the IT payload or DC to AC for a power source. It also could reduce the amount of capital required to pay for the system by removing an inverter. This would have to be analyzed as the backup power feed from the grid would require a rectifier.

Additionally, the backup power feed from the electrical utility can be reduced. In a traditional data center architecture, the power feed and the backup source, likely batteries backed by diesel generators, are both sized to account for 100% of the projected IT load plus the ancillary cooling system and some redundancy. The traditional data center architecture results in additional capital expense for the data center, potential efficiency losses, and inefficiencies in the system. With the fuel cell power source having some level of redundancy installed (N+1(x) systems), the backup utility need only be designed to accommodate the +x redundancy in the system to account for maintenance or failure of a fuel cell power source. Additionally, with the system described below, the ability for the power controller to adjust the IT load in the datacenter provides additional levels of availability to the data center in the event of a failure one or more of the redundant units in the power source. For example, if maintenance and a failure occurred in the power source with the IT load above the total power available from the fuel cell source and the backup power feed, the power controller could reduce IT load below the amount available to ensure continuity of critical operations.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Data center facilities range in critical levels according to the cost of down time to a business that utilizes the particular data center, the cost of ownership for the data center, and other factors. Typically, a data center facility includes redundant power systems to provide power to the server in the event of a power anomaly (e.g., blackout from utility provider, unstable utility power, etc.). Data center facilities utilize batteries and diesel generators to provide back-up power during a power anomaly. Batteries are sized as small as possible to cover short-durations and minimize cost and size of the battery. The diesel generators are designed to provide power for longer-duration power anomalies. The determination of which source provides power during the power anomaly is dependent upon the duration of the power anomaly.

The growth of data center energy consumption not only increases the total cost of ownership, but also leads to more serious environmental issues. To improve the energy efficiency of data center and reduce its greenhouse gas emission, fuel cell technology can be used to power data center facilities. A fuel cell is a power generator which converts fuel (e.g., hydrogen and natural gas) to electricity through an electrochemical process. Fuel cell systems have several advantages as power sources for data center facilities with high energy efficiency because they can be placed close to power consumers and thus avoid the energy losses in the long-distance power transmission. Additionally, fuel cell systems induce less environmental issues, and have high energy source reliability because fuel delivery infrastructure is usually buried and thus robust to severe weather. However, fuel cell response to power anomalies, power fluctuations, and large IT load changes create reliability issues because the fuel cell systems depend on the flow of natural gas fuel, which there is an inherent time lag for the system to respond with changes in power draw. Further, fuel cells respond poorly to rapid changes in power, which are common in data centers, and the rapid changes create reliability issues with the cells. Thus, fuel cell systems require expensive energy storage (batteries) or complex electrical grid-connected architecture to allow the grid to provide peak shaving or draw excess power from the fuel cells.

This document describes a system that optimizes power consumption to reduce fluctuations in power draw when using a fuel cell power system that powers a load (e.g., industrial loads, data centers, server racks, etc.). In some situations, the power consumption can be optimized by modifying the load powered by the fuel cell over time so as to reduce the fluctuations in power output by the fuel cell over time.

Fuel cells are a promising alternative to traditional power generation data center and distribution options. However, fuel cell response to transient power events, which are characteristic of IT hardware, is often slower than required in the context of an IT system because the fuel cells depend on the flow of natural gas fuel and electrochemical processes, such that there is an inherent time lag for the system to respond with changes in power draw. As a result, the use of fuel cells within the context of an IT system requires solutions that flatten the power draw required from the fuel cells so that the slow response time of the fuel cells does not negatively impact the reliability of the IT system.

A system that implements a solution to the fuel cell transient issues discussed above may include a power source (fuel cell), an Information Technology (IT) stack with a plurality of computing devices (data center), and a power controller that can adjust the load powered by the fuel cell in a manner that reduces the variation in power provided by the fuel cell. In some situations, the power controller can adjust the load powered by the fuel cell by adjusting the performance of computing devices that are included in the IT stack. For example, the power controller can monitor the power drawn by the computing devices to create a power consumption profile that is representative of the power consumption over time. The power controller can continue to monitor the power drawn by the computing devices, and adjust the performance of the IT stack based on current power draw conditions and the power consumption profile to reduce variations in power drawn by the computing devices.

For example, when power consumed by the computing devices begins to fall and/or the power consumption profile indicates that the power consumed by the computing devices will continue to fall, the power controller can increase the performance of the computing devices (e.g., by increasing a clock speed of the computing devices), which will cause the computing devices to consume more power, thereby reducing the amount by which the power consumption will fall. Similarly, when an increase in power drawn by the computing devices begins to rise and/or the power consumption profile indicates that the power consumed by the computing devices will continue to increase, the controller can reduce the performance of the computing devices (e.g., by reducing the clock speed of the computing devices) to decrease the amount by which the power consumed by the computing devices will increase. In this way, the power controller can reduce the variation in power drawn from the fuel cell, which reduces the problems associated with using fuel cells as the primary power source in IT stack environments.

In some situations, the power controller can also consider supply side fuel cell characteristics in the determination as to how to adjust the performance of the IT stack. For example, the power controller can consider changes in natural gas pressure when determining how to adjust the performance of the computing devices. Adjusting the performance of the IT stack may include clock speed management by increasing or decreasing the clock speed's on individual servers (e.g., schedule more or less workload, turn down the clock's, initiate a high-power turbo mode, etc.). Additionally, not all workload adjustments may be considered as equally important. For example, low-priority jobs could be dropped or more could be accepted to flatten power draw. Similarly, particular priority jobs could be dropped or more could be accepted for public cloud services, where the price could be adjusted to control power draw.

The power controller can also modify the number of devices powered by the fuel cell over time to maintain a more consistent level of power consumed from the fuel cell. For example, the power controller can power more devices, such as ancillary systems (e.g., cooling plants, floor cooling, IT hardware cooling, etc.), when the power consumed by the computing devices is falling and/or expected to fall, thereby reducing the amount by which the power consumed from the fuel cell will fall. Similarly, when the power consumed by the computing devices is increasing and/or expected to increase, the power controller can reduce the number of devices powered to reduce the amount by which the power drawn from the fuel cell will increase. In addition to changing the number of devices powered by the fuel cell, the power controller can also adjust settings of the ancillary devices powered by the fuel cell in order to reduce the variation in power drawn from the fuel cell. For example, the power controller can modulate server fans, floor cooling, pump speed, chillers, and the cooling towers.

These features and additional features are described in more detail below.

Figure 1:
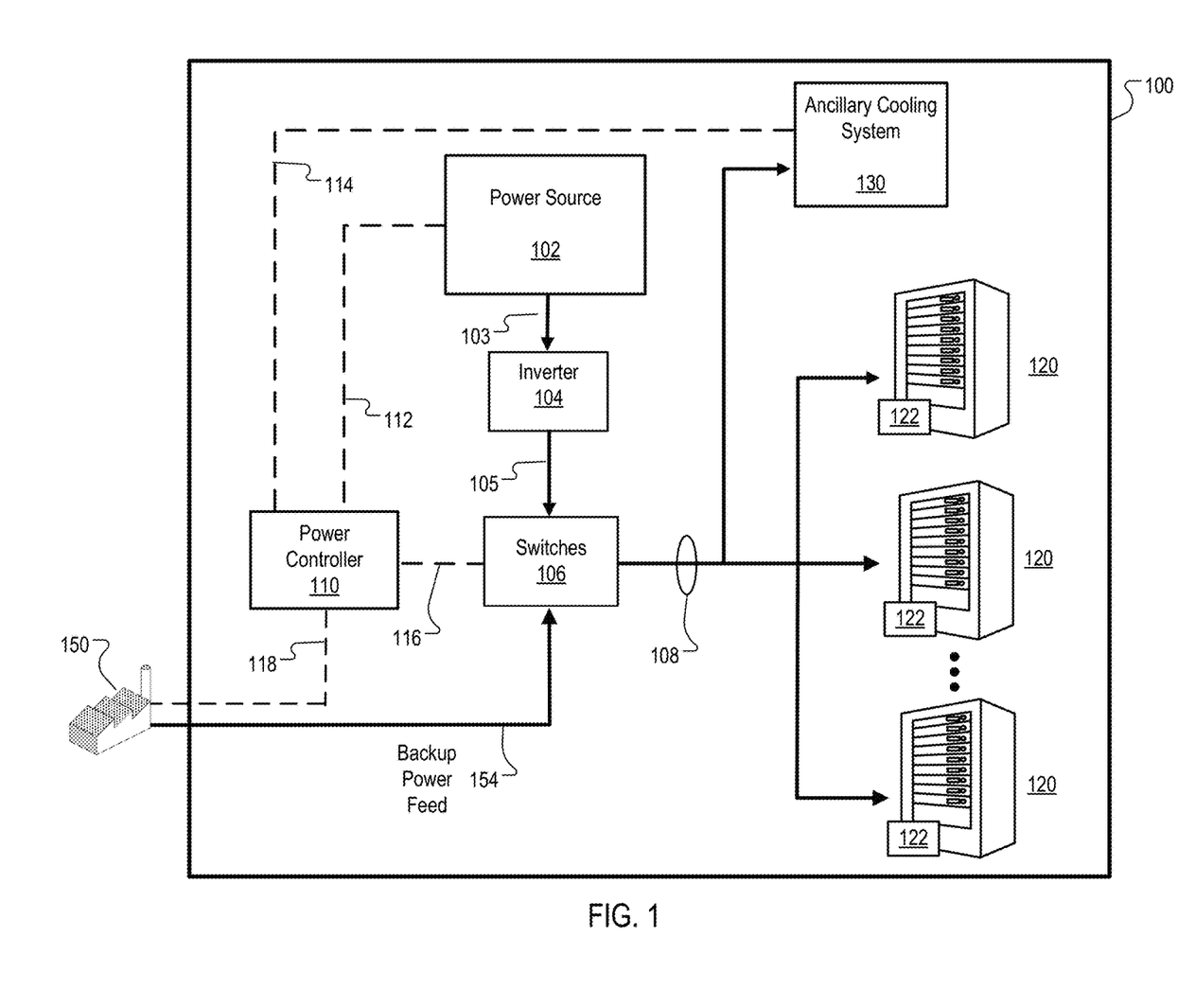
FIG. 1 is a block diagram illustration of an example data center facility.

FIG. 1 is a block diagram illustration of an example data center facility 100. The data center facility 100 can occupy one or more rooms within a building or essentially an entire building. The data center facility 100 is sufficiently large for installation of numerous (e.g., dozens or hundreds or thousands) alternating current devices, such as server racks 120 of computer equipment, ancillary cooling system 130, and other devices. Examples of the latter include motors, additional chillers, AC lighting, etc.

The server racks 120 of mounted computers are arranged in rows and are separated by aisles. Each server rack 120 includes multiple processing devices. In general, each processing device includes a motherboard, on which a variety of computer-related components are mounted. The data center facility 100 includes other computer and routing devices (not shown) to connect the facility to a network, such as the Internet.

Each rack 120 includes an AC to DC converter (not shown) that converts AC power to DC power for use by the server racks 120. Each rack 120 could also be powered via DC (native to the fuel cell power source) to DC. As each server rack 120 may house, for example, up to 100 processing devices, each server rack 120 may individually consume on the order of 50 kW of power (or some other amount of power), but the amount of power consumed can vary over time.

The data center facility 100 can also include an ancillary cooling system 130 that utilizes AC power received from the AC feed 105. The ancillary cooling system 130 includes various AC loads that are integrated into the data center facility 100. The data center facility 100 can also include additional loads (not shown) that utilize the AC power received from the AC feed 105. The additional loads can include various AC loads that are integrated into the data center facility 100. For example, the additional loads can include lighting, security systems, other computer and routing devices (not shown), motors, chillers and other loads that are part of the facility infrastructure.

An example power topology of the data center facility 100 is described for purposes of illustration, and other appropriate power distribution topologies can be used. In some implementations, the data center facility 100 includes a power source 102, an inverter 104, switches 106, battery devices 122, each in a respective server rack 120, an ancillary cooling system 130, and a power controller 110. Additionally, or alternatively, the data center facility 100 can include an AC backup power feed 154 that provides power from a utility provider 150 to power the server racks 120. Note that in some situations, the backup power feed 154 could be implemented as a primary power source.

The data center facility 100 is powered by a power source, such as power source 102. The power source 102 can include any type of energy storage device capable of supplying power to a data center for long term needs. In some implementations, the power source 102 is a fuel cell system. Note that in some situations, the fuel cell system could be utilized as a backup power source. The power source 102 can be located on-site or near the data center facility 100. Alternatively, the power source 102 can be located off-site and provides power through power feed 103 similar to backup power feed 154. The AC backup power feed 154 provides power from a utility provider 150 to power the server racks 120. Although one three phase feed is shown, the features described below can also be applied to situations in which two or more multi-phase feeds are used to provide power to a facility. Having a utility provider 150 as a back-up, provides a back-up power source for the facility in the event of a power anomaly from power source 102. A power anomaly is a deviation of mains power from one or more of a nominal supply voltage and frequency. For example, a power anomaly can include a power outage from power source 102, a voltage sag in excess of a threshold on the power line, a reduction in the amount of power delivered to the data center facility 100 from power source 102, and any other power disturbance of the like.

In some implementations, the data center facility 100 can also include an additional power source (not shown), such as a battery device, for short term power needs in case of a power anomaly. In some implementations, a battery device can be a lithium ion battery system with a capacity of at least one mega-watt hour. Other types of batteries can also be used as an additional power source. Batteries are also natively DC power sources, which could also provide distinct advantages to the use of a fuel cell.

The inverter 104 converts the DC power provided by the power source to AC power to provide the necessary power to the data center facility 100. In some implementations, the other loads, such as ancillary cooling system 130, are also powered by a second battery device.

The power controller 110 monitors the power performance by a monitor line input 108. In some implementations, should the power source 102 fail or become unreliable, the power controller 110 can utilize the switches 106 with control line 116 to isolate the data center facility 100 from the power source 102. In particular, the power feeds 103, 105, from the power source 102 and the inverter 206, respectively, can be switched off, and the power can be provided from the utility provider 150 through backup power feed 154. The power controller 110 can communicate with the power source 102 via control line 112. The power controller 110 can communicate with the utility provider via control line 118. The power controller 110 can communicate with and control the performance of the ancillary cooling system 130 via control line 114. The power controller 110 can also communicate with and control the performance of the servers 120 and other load devices. These features are described in more detail with reference to FIG. 2, which is a block diagram of a power controller 110 for a fuel cell system, one or more server processing devices, and other available load devices performing a service in a data center.

According to examples described below, power source 102 is a fuel cell system. Other power sources and topologies can also be used, however. Processes and examples for controlling power distribution by the power controller 110 within a data center facility 100 using a fuel cell system as a power source are now described with reference to FIGS. 2-5 below.

Figure 2:
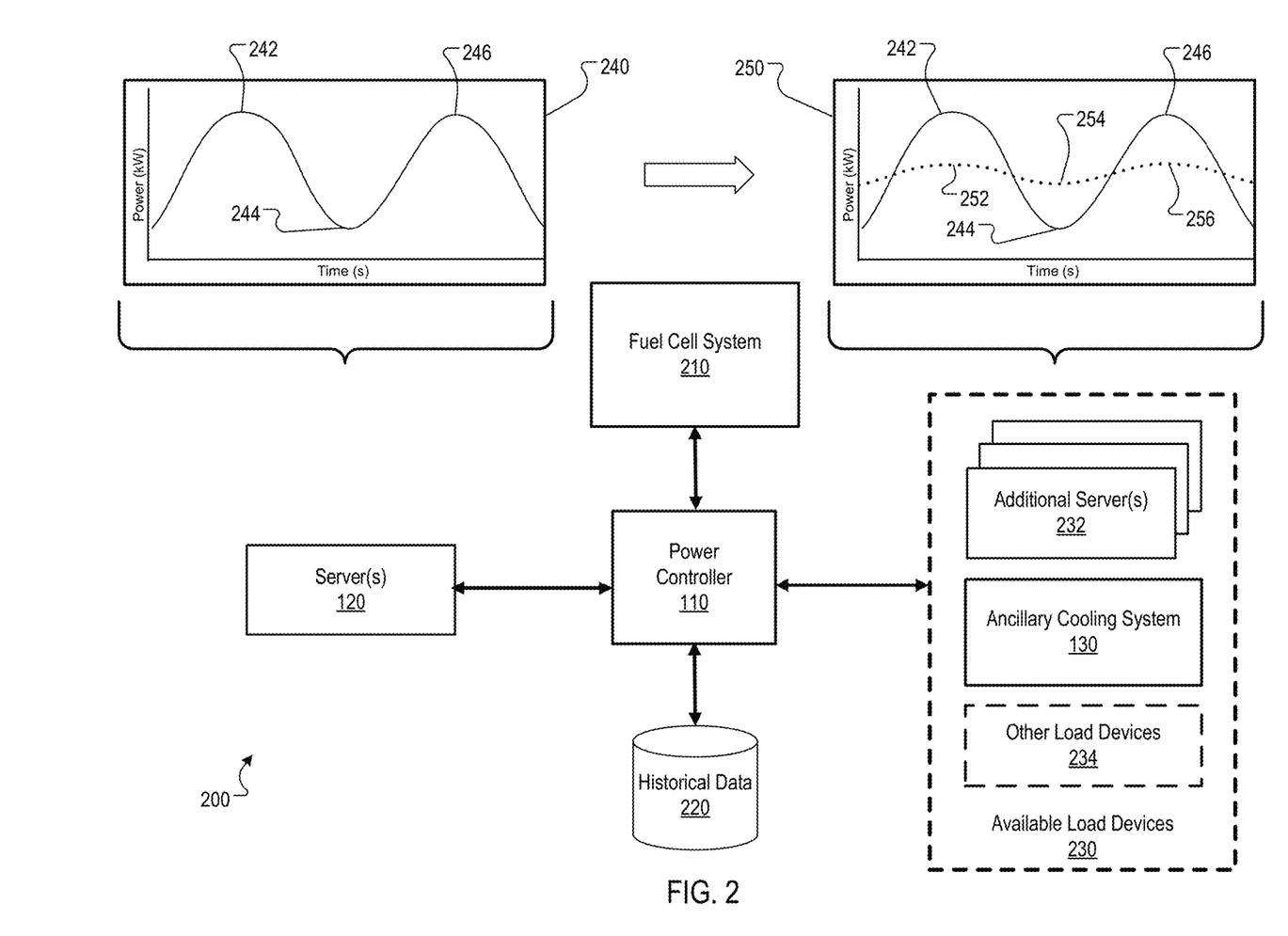
FIG. 2 is a block diagram illustration of controlling power distribution using a fuel cell system.

FIG. 2 is a block diagram illustration of an example environment 200 of controlling power distribution by a power controller 110 using a fuel cell system 210. According to various implementations, the power controller 110 may communicate with several devices (e.g., power sources and loads), databases, and/or servers. In particular, FIG. 2 illustrates communications of the power controller 110 being operatively connected with fuel cell system 210, server(s) 120, other available load devices 230, and historical database 220. In some aspects, the example environment 200 is reflective of an example data center facility, such as data center facility 100 of FIG. 1. As shown in FIG. 2, the other available load devices 230 can include additional servers 232, ancillary cooling system 130, and other load devices 234. Other power sources, loads, and topologies can also be used, however, in other environments.

As illustrated in FIG. 2, the power controller 110 is shown being operatively connected to a historical database 220 to store historical data. The historical data can include at least one power consumption profile for each device. Power consumption profiles can include information stored to computer-readable media reflecting power consumption by each respective device. In this example, power consumption profiles are stored to a database 220, but in other situations, power consumption profiles may be stored as any suitable data structure, including without limitation a text file, table, etc.

A given power consumption profile may include such information as identification (e.g., name, location, and/or other identification information) identifying a given device to which the power consumption profile pertains. A given power consumption profile may also include historical power consumption information. For example, the historical power consumption information may include a history of all power sources and loads, identification of all resources to which the respective device was allocated for servicing the demands, information reflecting the cumulative (total) amount of power consumed by all resources allocated for servicing the demands required, information reflecting the amount of power consumed by individual devices, and/or any other historical data reflection power consumption by devices for serving prior demands of the respective power source. The historical information may reflect a full history of power consumption by the respective device, and/or it may reflect a moving window (e.g., over a previous 6-month period) of power consumption by the respective device.

According to some implementations, the historical database 220 can store a power consumption profile at a component level, such as at the server level. According to some implementations, the historical database 220 can store a power consumption profile at the component and subcomponent level. For example, a server, such as server 120, can include a plurality of computing devices and processors. The power controller 110 can be configured to control performance at the server level and at the subcomponent level within each server.

In some implementations, the power controller 110 can optimize the power consumption within the example environment 200 so as to reduce the variation of power consumption over time. For example, as illustrated by plots 240 and 250 of power consumption versus time, the power variation depicted by the plot 240 can be reduced as shown by the dotted line curve in the plot 250. In particular, plot 240 depicts power consumption over time for an example data center facility before the power controller 110 is implemented, with power consumption peaks 242, 246, and a power consumption valley 244. The transitions between power consumption peaks and valleys are also referred to herein as transient power events which are variations in power consumption. As discussed above transients can create reliability issues when fuel cells are used to power IT systems because fuel cells depend on the flow of natural gas fuel, such that there is an inherent time lag for the fuel cell system to respond with changes in power draw. Thus, the power controller 110 needs to limit or control the transient peaks and valleys. As described herein, an exemplary power controller 110 can acquire information from equipment in a server farm and manage power based in part on such information. The power controller 110 may rely on a power model to manage power consumption of a data center facility, or server farm. For example, a data center facility 100 can include a processor-based controller, such as power controller 110, which relies on control logic where the control logic manages power consumption based in part on a power model.

Plot 250 includes a dotted line that depicts power consumption over time for the data center facility after the power controller 110 is implemented with the power controller 110 controlling the loads. The plot 250 also includes a solid line that represents the same power consumption of plot 240 for purposes of reference. The dotted line depicts the resulting power consumption as controlled by the power controller 110. As shown by comparison of the solid line to the dotted line, previous power consumption peaks 242, 246, are being reduced to peaks 252, 256, respectively. Similarly, valley 244 is now being drawn up to valley 254.

To reduce the variation of the power consumption over time, the power controller 110 monitors a present power consumption and uses a power consumption profile for all (or some) of the loads or devices that are drawing power from the fuel cell system 210. For example, if the power controller 110 determines, based on the present power consumption and/or the power consumption profile that power consumption of the servers 120 is increasing toward peak 242, the power controller 110 can decrease the aggregate load that is being powered by the fuel cell system 210 to offset that expected increase in power consumption. In some situations, the power controller 110 can lower the aggregate load by decreasing the performance of one or more servers 120. Additionally, or alternatively, the controller 110 can reduce the aggregate load powered by the fuel cell system by offloading one or more of the additional servers 232, the ancillary cooling system, and/or other load devices 234 to be powered by alternative power sources, thereby reducing the power that is required to be output by the fuel cell system, which in turn reduces the variation in power consumption, as depicted by the dotted line in the plot 250.

According to some implementations, the power controller 110 can lower the aggregate load to the one or more devices by sending a control signal to each respective device. The control signal allows the power controller 110 to control and manage the performance of each respective device. For example, the power controller 110 can adjust clock speed management of the servers 120 or additional servers 232 by sending a control signal to reach respective server to reduce power consumption by decreasing the clock speed's on individual servers (e.g., schedule less workload, turn down the clock's, initiate a low-power mode, etc.). Additionally, or alternatively, the controller 110 can send a control signal to the ancillary cooling system 130 to reduce a present throughput, or the control signal could control the ancillary cooling system 130 to temporarily stop.

In some implementations, the power controller 110 can lower the aggregate load to the one or more devices by activating a switch that cuts the power to the respective device from the fuel cells. For example, each respective device that is powered by the fuel cell system 210 could be connected to the fuel cell system 210 through a switch, such as switches 106 of FIG. 1. The power controller 110 can thus reduce the aggregate load powered by the fuel cell system by cutting off the power one or more devices, such as less important devices of the data center facility, by activating a switch.

When the power controller 110 determines, based on the present power consumption and/or the power consumption profile that power consumption of the servers 120 is increasing toward valley 244, the power controller 110 can increase the aggregate load that is being powered by the fuel cell system 210 to offset that expected decrease in power consumption. In some situations, the power controller 110 can increase the aggregate load by increasing the performance of one or more servers 120. Additionally, or alternatively, the power controller 110 can increase the aggregate load powered by the fuel cell system 210 by switching one or more of the one or more of the additional servers 232, the ancillary cooling system, and/or other load devices 234 that are powered by alternative sources, to be powered by the fuel cell system 210. By adding the additional devices and increasing the power that is required to be output by the fuel cell system, variation in power consumption is reduced, as depicted by the dotted line in the plot 250

According to some implementations, the power controller 110 can increase the power consumption of one or more devices powered by the fuel cells by sending a control signal to each respective device. As discussed above, the control signal allows the power controller 110 to control and manage the performance of each respective device. For example, the power controller 110 can adjust clock speed management of the servers 120 or additional servers 232 by sending a control signal to reach respective server to increase power consumption by increasing the clock speed's on individual servers (e.g., schedule more workload, turn up the clock's, initiate a high-power turbo mode, etc.). Additionally, or alternatively, the power controller 110 can send a control signal to the ancillary cooling system 130 to increase a present throughput. For example, the control signal can control the ancillary cooling system 130 to decrease the temperature the ancillary cooling system 130 is trying to maintain, thereby decreasing the power consumption.

In some implementations, the power controller 110 can increase the aggregate load to the one or more devices by activating a switch that provides power to a device from the fuel cells that was previously cut off. For example, as discussed above, each respective device that is powered by the fuel cell system 210 could be connected to the fuel cell system 210 through a switch, such as switches 106 of FIG. 1. The power controller 110 can thus increase the aggregate load powered by the fuel cell system 210 by supplying power to other load devices 234 that were previously turned off, such as less important devices of the data center facility, by activating a switch.

In some implementations, workload adjustments managed by the power controller 110 may be based on a priority ranking or priority scale, because not all workload adjustments may be considered as equally important. For example, low-priority jobs could be dropped or more could be accepted to flatten power draw. Additionally, or alternatively, particular priority jobs could be dropped or more could be accepted for public cloud services, where the price could be adjusted to control power draw. For example, if the servers 120 are handling a public cloud service and an increase in power draw is needed to flatten power draw, the power controller 110 could send a message to a controller for the cloud services to adjust the price in order to increase the traffic flow of customers wanting to use the cloud service (e.g., decrease in price should increase the traffic flow).

Figure 3:
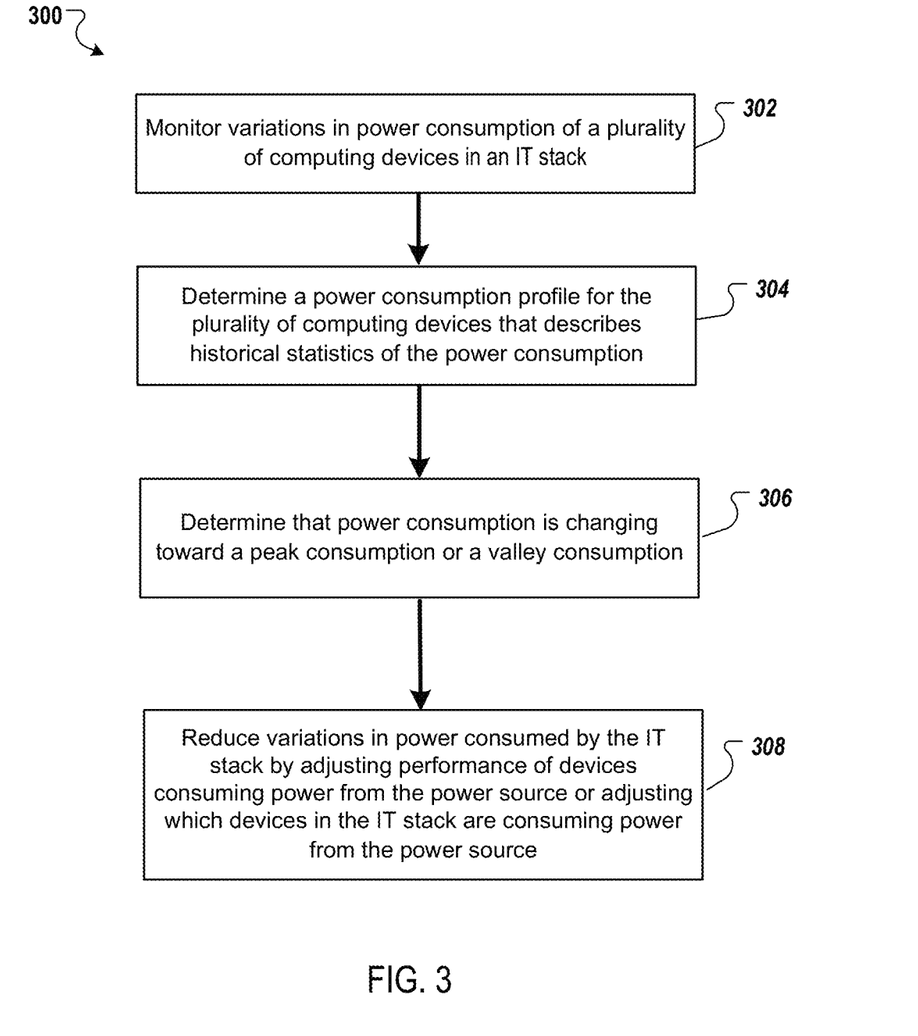
FIG. 3 is a flow diagram describing a process for controlling power consumption within a data center facility using a fuel cell system.

FIG. 3 is a flow diagram describing a process 300 for controlling power consumption within a data center facility using a fuel cell system. The process 300 can be performed by the power controller 110 or in any appropriate data processing apparatus. Operations of the process 300 can be implemented as instructions stored on a non-transitory computer readable medium, and execution of the instructions by one or more data processing apparatus can cause the one or more data processing apparatus to perform the operations of the process 300.

The power controller 110 monitors variations in power consumption of a plurality of computing devices in an IT stack (302). In some implementations, the power controller 110 receives data from various devices, such as power monitors, for each server rack 120. In some situations, the power consumption can be provided by the fuel cell system 210, or measured by another device. The power controller 110 analyzes the power consumption data for variations for the server racks 120. For example, variations may be determined to occur when the power consumption for the server racks 120 is not within acceptable operational ranges, e.g., +/−5% of a specified power draw, etc. The variations in power consumption are shown in FIG. 2 by plots 240, 250, with the peaks 242, 246, and valley 244. In some situations, the amount of power consumed for a predetermined amount of time can be used to determine an energy rating, e.g., X kW/H, or Y MW/H, etc. The power controller 110 could also be used to adjust IT output based on external signals from the electrical or natural gas utility proactively to either reduce backup power draw 154 or natural gas consumption by power source 102. Additionally, or alternatively, the power controller 110 can adjust IT output and workload based on a current cost of natural gas, if the cost of the natural gas supply varies over time.

The power controller 110 determines a power consumption profile for the plurality of computing devices that describes historical statistics of the power consumption (304). In some implementations, the power consumption profile represents an association between the processor utilization and the power consumption of the computing devices. The power consumption profile is indicative of energy efficiency of the computing devices in the data center. The power controller 110 tracks and records power consumption and power transients to create and maintain a power consumption profile for the data center facility 100 that includes historical statistics. For example, assume the power consumption profile indicates that particular work hours of each standard work day (e.g., 9 am-11 am and/or 2 pm-4 pm) the power consumption of the servers 120 reaches two peaks and/or plateaus over a certain period of time for a typical workday. Additionally, or alternatively, a peak consumption may occur nightly during a server backup session. In some situations, the servers may experience some downtime, such as during a weekend, in the early morning hours, or during a holiday break. For illustrative purposes, assume the peaks are illustrated by peaks 242, 246, and the downtimes are illustrated as valley 244 in FIG. 2. These historical statistics of peaks and valleys are used by the power controller 110 to determine a power consumption profile for the plurality of computing devices.

In some implementations, a power consumption profile for the data center facility 100 may be provided to the power controller 110 by another device in the data center facility 100, if available. Additionally, or alternatively, a power consumption profile for the data center facility 100 may be provided by another entity, such as the fuel cell system provider, or by the utility provider before the fuel system was implemented, if available.

The power controller 110 determines that power consumption is changing toward a peak consumption or a valley consumption (306). For example, assume the present power consumption for the data center is X KWH, and based on power consumption profile for the plurality of computing devices (e.g., certain hours of a day experience higher server traffic, thus higher power consumption), the power controller 110 can determine that the power consumption for the data center is going to increase to Y KWH for a particular portion of the day. The fuel cell system may not be able to respond to the particular increase of Y-X KWH (e.g., the difference between the present power consumption and the expected peak power consumption) over which the change is going to happen because of the time lag of the fuel cell response.

In some situations, the power controller 110 can determine that the power consumption for the data center facility is going to decrease based on power consumption profile for the plurality of computing devices. A particular decrease of 10% or more, for example, can create issues for a fuel cell system due to the time lag of the fuel cell response. For example, assume the present power consumption for the data center is X KWH, and based on power consumption profile for the plurality of computing devices (e.g., certain hours of a day experience higher server traffic, thus higher power consumption), the power controller 110 can determine that the power consumption for the data center is going to decrease to Z KWH for a particular portion of the day. The fuel cell system may not be able to respond to the particular decrease of Z-X KWH (e.g., the difference between the present power consumption and the expected valley power consumption) over which the change is going to happen because of the time lag of the fuel cell response.

The power controller 110 reduces variations in power consumed by the IT stack based on a change in power consumption and the power consumption profile (308). In some implementations, the power controller 110 can reduce the variations in power consumed by adjusting performance of devices consuming power from the power source. In some situations, the power controller 110 can reduce the variations in power consumed by adjusting which devices in the IT stack are consuming power from the power source. For example, the power controller 110 can directly (or indirectly) control the power settings in each server 120, the additional servers 232, the ancillary cooling system 130, and other load devices. For example, if the determined variations were decreases in power draw, such as decreases toward the valley 244 of plot 240 in FIG. 2, power controller 110 can offset the decrease by increasing the aggregate load, which will increase the power draw, thereby flattening the power consumption over time. To increase the aggregate load, the power controller 110 can add additional workload to the data center such that servers 120 and/or additional servers 232 are given additional workload, which would then increase the power consumption with each particular server rack. Additionally, or alternatively, power controller 110 could instruct the computer system (e.g., servers 120 and/or additional servers 232) to be operated in a high-power (turbo) mode. Additionally, or alternatively, power controller 110 could directly control the ancillary cooling system 130 to be operated in excess of the required operating point.

In some implementations, the power controller 110 communicates to server controllers at each server 120, and the power controller 110 sends control signals the respective server controllers to manage the power settings in each respective server 120.

Figure 4:
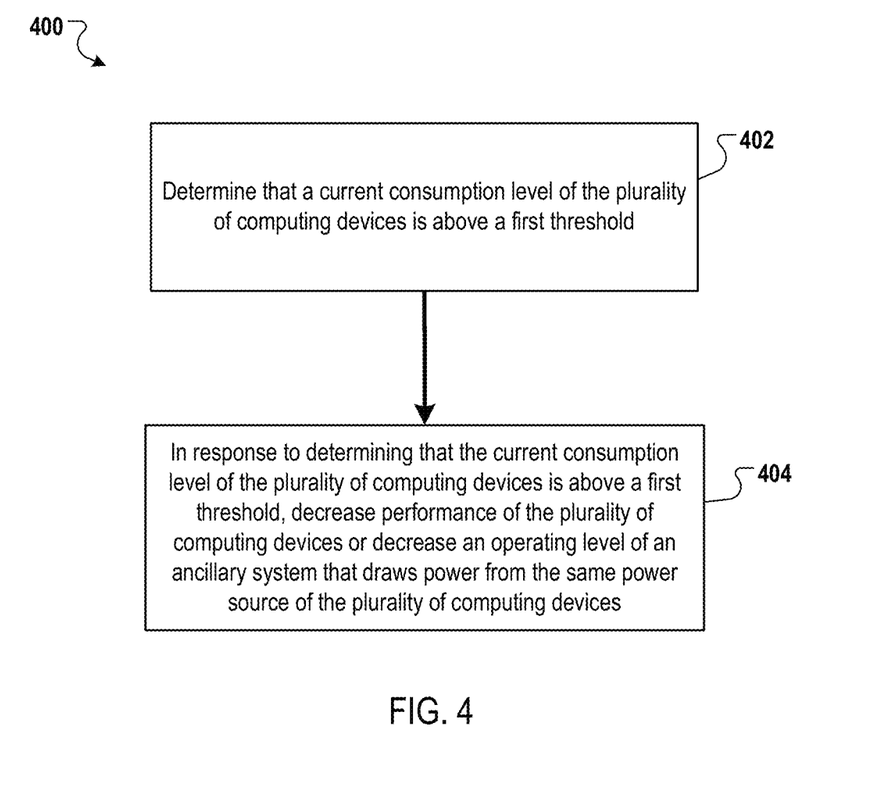
FIG. 4 is a flow diagram describing a process for monitoring and adjusting a consumption level of computing devices within a data center facility using a fuel cell system.

FIG. 4 is a flow diagram describing a process 400 for monitoring and adjusting a consumption level of computing devices within a data center facility using a fuel cell system. The process 400 can be performed by the power controller 110 of FIG. 1, or in any appropriate data processing apparatus. Operations of the process 400 can be implemented as instructions stored on a non-transitory computer readable medium, and execution of the instructions by one or more data processing apparatus can cause the one or more data processing apparatus to perform the operations of the process 400.

The power controller 110 determines that a present consumption level of the plurality of computing devices is above a first threshold (402). For example, the power controller 110 can measure the power consumption of the data center facility 100 and/or receive the power consumption level from another device, such as the fuel cell system 210. The power controller 110 can then determine if the current power consumption is above a particular threshold. For example, if the data center facility runs at an average X KWH, the first threshold could be set at +10% (or some other appropriate level). Thus, if the data center facility runs at 110% of X KWH or higher, the power controller initiates the next steps of the process 400 since the upper power threshold was reached.

In response to determining that the present consumption level of the plurality of computing devices is above a first threshold, the power controller 110 decreases performance of the plurality of computing devices or decreases an operating level of an ancillary system that draws power from the same power source of the plurality of computing devices (404). As discussed herein, the power controller 110 can decrease performance of any device the power controller 110 is operatively connected to within the data center facility 100 that is drawing power from the power source 102, such as fuel cell system 210. For example, the power controller 110 can reduce the assigned workload to the data center such that servers 120 and/or additional servers 232 which would then decrease the power consumption with each particular server rack. Additionally, or alternatively, power controller 110 could instruct the compute system (e.g., servers 120 and/or additional servers 232) to be operated in a low-power mode. Additionally, or alternatively, power controller 110 could control the ancillary cooling system 130 to be temporarily operated in a reduced capacity, while still maintaining a sufficient operating point to prevent any overheating damage that may occur to the devices being cooled by the ancillary cooling system 130. In some implementations, one or more other load devices 234 of the available load devices 230 that are operatively connected to the power controller 110 and that draw power from the fuel cell system 210 can be controlled by the power controller 110 to decrease the power drawn by the respective other load devices 234 in order flatten the power drawn by the fuel cell system 210.

Figure 5:
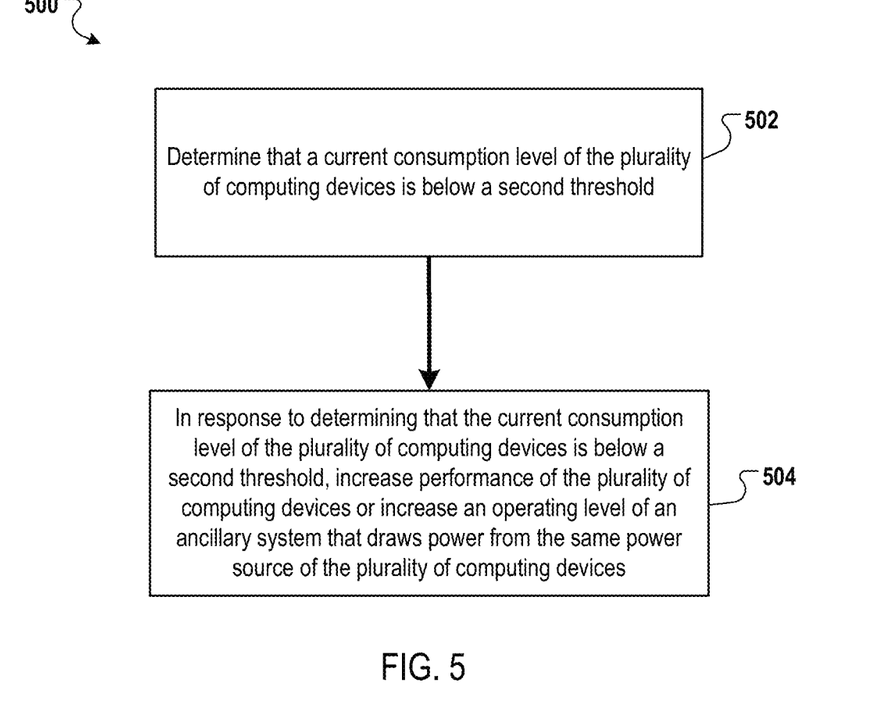
FIG. 5 is a flow diagram describing a process for monitoring and adjusting a consumption level of computing devices within a data center facility using a fuel cell system.

FIG. 5 is a flow diagram describing a process 500 for monitoring and adjusting a consumption level of computing devices within a data center facility using a fuel cell system. The process 500 can be performed by the power controller 110 of FIG. 1, or in any appropriate data processing apparatus. Operations of the process 500 can be implemented as instructions stored on a non-transitory computer readable medium, and execution of the instructions by one or more data processing apparatus can cause the one or more data processing apparatus to perform the operations of the process 500.

The power controller 110 determines that a present consumption level of the plurality of computing devices is below a second threshold (502). For example, the power controller 110 can measure the power consumption of the data center facility 100 and/or receive the power consumption level from another device, such as the fuel cell system 210. The power controller 110 can then determine if the current power consumption is below a particular threshold. For example, if the data center facility runs at an average X KWH, the second threshold could be set at −10% (or some other appropriate level). Thus, if the data center facility runs at 90% of X KWH or lower, the power controller could initiate the next steps of the process 500 since the current power consumption is below the lower power threshold value.

In response to determining that the present consumption level of the plurality of computing devices is below a second threshold, the power controller 110 increases performance of the plurality of computing devices or increases an operating level of an ancillary system that draws power from the same power source of the plurality of computing devices (504). Recall that the power controller 110 can make the determination to increase performance of any device the power controller 110 is operatively connected to within the data center facility 100 that is drawing power from the power source 102, such as fuel cell system 210. For example, the power controller 110 can increase the assigned workload to the data center such that servers 120 and/or additional servers 232 which would then increase the power consumption with each particular server rack. Additionally, or alternatively, power controller 110 could instruct the compute system (e.g., servers 120 and/or additional servers 232) to be operated in a high-power (turbo) mode. For example, increasing the performance of the plurality of computing devices could include sending a control signals to the servers 120 and/or additional servers 232 to increase a clock speed of at least one or more of the servers. Additionally, or alternatively, power controller 110 could control the ancillary cooling system 130 to be temporarily operated in excess of the required operating point. In some implementations, one or more other load devices 234 of the available load devices 230 that are operatively connected to the power controller 110 and that draw power from the fuel cell system 210 can be controlled by the power controller 110 to increase the power drawn by the respective other load devices 234 in order flatten the power drawn by the fuel cell system 210.

Figure 6:
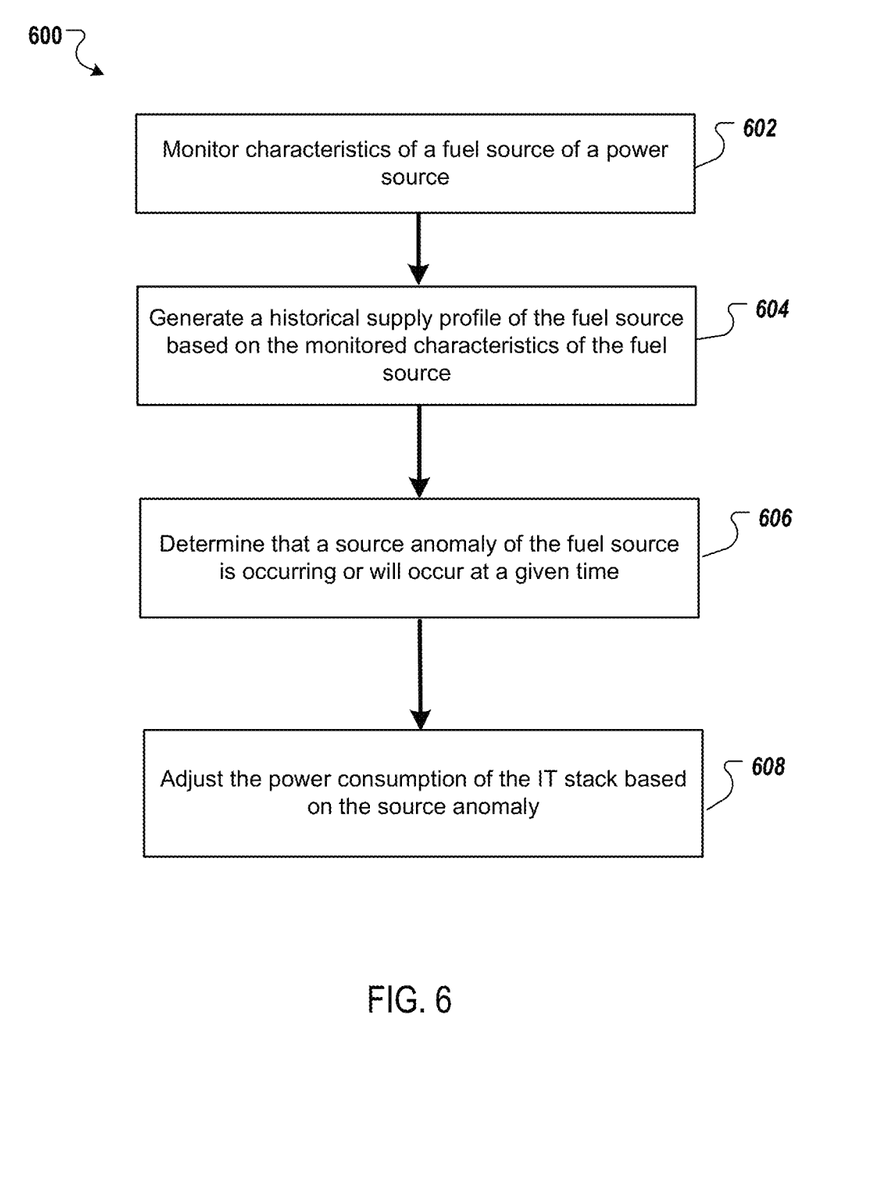
FIG. 6 is a flow diagram describing a process for monitoring a fuel source of a power source within a data center facility.

FIG. 6 is a flow diagram describing a process for monitoring a fuel source of a power source within a data center facility. The process 600 can be performed by the power controller 110 or in any appropriate data processing apparatus. Operations of the process 600 can be implemented as instructions stored on a non-transitory computer readable medium, and execution of the instructions by one or more data processing apparatus can cause the one or more data processing apparatus to perform the operations of the process 600.

The power controller 110 monitors characteristics of a fuel source of a power source (602). In some implementations, the power controller 110 receives data from various devices, such as fuel source monitors, for the fuel source of the power source 102. In some situations, the characteristics of a fuel source can be provided by the fuel cell system 210, or measured by another device, such as pressure sensor, a flow rate sensor, or another sensor that can provide information about the availability of fuel to the fuel cell. The power controller 110 monitors the data of the fuel source characteristics. In some implementations, other characteristics that are monitored include, but are not limited to, operating conditions such as feed gas humidity, operation temperature, feed gas stoichiometry, air pressure, and gas flow patterns. For example, a fuel cell system (e.g., fuel cell system 210), generates power by converting fuel (e.g., hydrogen and natural gas) to electricity through an electrochemical process. The power controller 110 monitors the flow rate of the fuel source and collects historical data on the supply of the fuel. In some situations, the power controller 110 receives the characteristics of the fuel source from the utility provider, if available. For example, the utility provider can send a communication to the data center facility that there will be a scheduled reduction in the flow rate of the fuel source for a certain period of time.

The power controller 110 generates a historical supply profile of the fuel source based on the monitored characteristics of the fuel source (604). The historical supply profile is indicative of fuel source efficiency to the fuel cell system 210 in the data center. The historical supply profile can specify changes in fuel supply characteristics (e.g., such as those discussed above) over time, changes in fuel prices over time, and/or any other fuel supply characteristics over time. The power controller 110 (or some other device) tracks and records fuel availability and flow rates to create and maintains a historical supply profile for the data center facility 100 that includes the historical statistics. For example, assume the historical supply profile indicates that particular hours of a day (e.g., 2 pm-4 pm) the fuel source supply flow rate drops compared to other hours in the day. In some situations, a particular day of the year may historically have fuel supply flow rate issues, and the historical supply profile would be indicative of those particular days. These historical statistics of fuel supply characteristics are used by the power controller 110 to determine a historical supply profile for the fuel cell system 210. The historical supply profile can be used to predict changes in fuel supply that will occur. For example, if fuel supply historically increases during a particular season or month, the fuel supply can be predicted to increase when that particular season or month is nearing.

The power controller 110 determines that a source anomaly of the fuel source is occurring or will occur at a given time (606). A fuel source anomaly is indicative of a fuel supply loss over a shortened duration. For example, to determine that a source anomaly of the fuel source will occur at a given time, assume the present fuel supply flow rate for the data center is X mL/min. Based on the historical supply profile for the fuel source (e.g., certain hours of a day experience a drop in flow rate for the fuel source), the power controller 110 can determine that the flow rate of the fuel source is going to decrease to Y mL/min for a particular portion of the day. The fuel cell system may not be able to respond to the particular decrease of Y–X mL/min (e.g., the difference between the present fuel flow rate and the expected fuel flow rate) over which the change is going to happen because the fuel cell system requires a minimum flow rate for operation. In some implementations, a source anomaly is indicative of a fuel supply loss over a shortened duration for a backup power feed, such as backup power feed 154.

In some implementations, the power controller 110 can determine that a fuel source anomaly of the fuel source is occurring. A fuel source anomaly is indicative of a fuel supply loss over a shortened duration. For example, a particular flow rate threshold can be set by the power controller 110, that when the flow rate drops below the threshold, the power controller 110 can react by changing the power consumption for the devices in the data center facility. In some implementations, the flow rate threshold is a plurality of step down thresholds. For example, each time the flow rate decreases 5% from a particular flow rate of X mL/min, the power controller 110 can reduce the power consumption for the data center facility by a similar 5%, or as appropriate to maintain a stable fuel cell system operation. A particular decrease of 5% or more in the flow rate, for example, can create issues for a fuel cell system due to the time lag of the fuel cell response. In some implementations, a source anomaly can be detected by the power controller 110 from the power source 102, the backup power feed 154, or another power source that the power controller 110 is connected to and able to monitor.

The power controller 110 adjusts the power consumption of the IT stack based on the source anomaly (608). In some implementations, the power controller 110 can reduce the variations in power consumed by adjusting performance of devices consuming power from the power source. In some situations, the power controller 110 can reduce variations in power consumed by adjusting which devices in the IT stack are consuming power from the power source. For example, the power controller 110 can directly (or indirectly) control the power settings in each server 120, the additional servers 232, the ancillary cooling system 130, and other load devices. For example, if the source anomaly causes a decrease in power available from the fuel cell system, the power controller 110 can offset the decrease by decreasing the aggregate load. To decrease the aggregate load, the power controller 110, as discussed herein can decrease performance of any device the power controller 110 is operatively connected to within the data center facility 100 that is drawing power from the power source 102, such as fuel cell system 210. For example, the power controller 110 can reduce the assigned workload to the data center such that servers 120 and/or additional servers 232 which would then decrease the power consumption with each particular server rack. Additionally, or alternatively, power controller 110 could instruct the compute system (e.g., servers 120 and/or additional servers 232) to be operated in a low-power mode. Additionally, or alternatively, power controller 110 could control the ancillary cooling system 130 to be temporarily operated in a reduced capacity, while still maintaining a sufficient operating point to prevent any overheating damage that may occur to the devices being cooled by the ancillary cooling system 130. In some implementations, one or more other load devices 234 of the available load devices 230 that are operatively connected to the power controller 110 and that draw power from the fuel cell system 210 can be controlled by the power controller 110 to decrease the power drawn by the respective other load devices 234.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

The operations described in this specification can be implemented as operations performed by a data processing apparatus on data stored on one or more computer-readable storage devices or received from other sources.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system, comprising:
    a power source;
    an Information Technology (IT) stack electrically coupled to the power source, wherein the IT stack includes a plurality of computing devices; and
    a power controller communicatively coupled to the power source and the plurality of computing devices, the power controller configured to perform operations comprising:
        monitoring variations in power consumption of the plurality of computing devices,
        determining, for the plurality of computing devices and based on the monitored power consumption, a power consumption profile for the plurality of computing devices that describes historical statistics of the power consumption;
        reducing variations in power consumed by the IT stack by adjusting performance of devices consuming power from the power source or adjusting which devices in the IT stack are consuming power from the power source based on a change in the power consumption and the power consumption profile, including:
            decreasing performance of the plurality of computing devices to reduce power consumption by the plurality of computing devices in response to a determination that i) the power consumption of the plurality of computing devices is beginning to increase based on a currently monitored power consumption, and ii) that the power consumption of the plurality of computing devices will continue to increase toward a peak consumption based on the power consumption profile; and
            increasing performance of the plurality of computing devices to increase power consumption by the plurality of computing device in response to a determination that i) the power consumption of the plurality of computing devices is beginning to decrease based on a currently monitored power consumption, and ii) that power consumption of the plurality of computing devices will continue to decrease toward a valley consumption based on the power consumption profile.

2. The system of claim 1, wherein adjusting which devices in the IT stack are consuming power from the power source comprises increasing a number of the devices in the IT stack that are consuming power from the power source as the power consumption of the plurality of computing devices decreases during a time that the power consumption profile indicates the power consumption of the plurality of computing devices will continue to decrease, and decreasing the number of computing devices in the IT stack that are consuming power from the power source as the power consumption of the plurality of computing devices increases during a time that the power consumption profile indicates the power consumption of the plurality of computing devices will continue to increases.

3. The system of claim 1, wherein the power controller is further configured to perform operations including predicting an upcoming change in power consumption by the plurality of computing devices based on the power consumption profile, wherein adjusting the performance of devices consuming power begins prior to a time at which the upcoming change is predicted to start.

4. The system of claim 1, wherein the power controller is further configured to perform operations including:
   decreasing performance of the plurality of computing devices in response to a determination that a present consumption level of the plurality of computing devices is above a first threshold; and
   increasing performance of the plurality of computing devices in response to a determination that the present consumption level of the plurality of computing devices is below a second threshold.

5. The system of claim 1, wherein the power source is a fuel cell.

6. The system of claim 1, wherein the power consumption profile comprises a total power consumption level of the IT stack and a respective individual power consumption level for each respective computing device.

7. The system of claim 1, wherein:
   increasing the performance of the plurality of computing devices comprises adding additional workload to at least some of the plurality of computing devices in the IT stack wherein adding additional workload comprises adding to the computing devices jobs that are ranked at a lower priority than jobs currently being performed by the plurality of computing devices; and
   decreasing the performance of the plurality of computing devices comprises removing workload from at least some of the plurality of computing devices in the IT stack, wherein workload comprises removing from the computing devices jobs that currently being performed by the plurality of computing devices and that are ranked at a lower priority than other jobs currently being performed by the plurality of computing devices.

8. The system of claim 1, wherein increasing the performance of the plurality of computing devices comprises increasing a clock speed of at least some of the plurality of computing devices in the IT stack.

9. The system of claim 1, further comprising an ancillary cooling system, wherein the power controller is configured to perform operations including:
   increasing an operating level of the ancillary cooling system when the power consumption of the plurality of computing devices decreases; and
   decrease an operating level of the ancillary cooling system when the power consumption of the plurality of computing devices increases.

10. The system of claim 1, wherein the power controller is further configured to perform operations including:
    monitoring characteristics of a fuel source of the power source;
    generating, based on the monitored characteristics of the fuel source, a historical supply profile of the fuel source;
    determining that a source anomaly of the fuel source or a backup power feed is occurring or will occur at a given time; and
    adjusting the power consumption of the IT stack based on the source anomaly.

11. The system of claim 10, wherein determining that the source anomaly of the fuel source is occurring or will occur at a given time comprises determining that the level of the fuel source is below a power source threshold.

12. The system of claim 10, wherein the power source is a fuel cell, and monitoring characteristics of the fuel source comprises monitoring a level of natural gas being provided to the fuel cell.

13. A method, comprising:
    monitoring, by a power controller, variations in power consumption of a plurality of computing devices in an Information Technology (IT) stack, the IT stack being electrically coupled to a power source, wherein the power controller is communicatively coupled to the power source and the plurality of computing devices;
    determining, by the power controller, for the plurality of computing devices and based on the monitored power consumption, a power consumption profile for the plurality of computing devices that describes historical statistics of the power consumption;
    reducing, by the power controller, variations in power consumed by the IT stack by adjusting performance of devices consuming power from the power source or adjusting which devices in the IT stack are consuming power from the power source based on a change in the power consumption and the power consumption profile, including:
       decreasing performance of the plurality of computing devices to reduce power consumption by the plurality of computing devices in response to a determination that i) the power consumption of the plurality of computing devices is beginning to increase based on a currently monitored power consumption, and ii) that the power consumption of the plurality of computing devices will continue to increase toward a peak consumption based on the power consumption profile; and
       increasing performance of the plurality of computing devices to increase power consumption by the plurality of computing device in response to a determination that i) the power consumption of the plurality of computing devices is beginning to decrease based on a currently monitored power consumption, and ii) that power consumption of the plurality of computing devices will continue to decrease toward a valley consumption based on the power consumption profile.

14. The method of claim 13, wherein adjusting which devices in the IT stack are consuming power from the power source comprises increasing a number of the devices in the IT stack that are consuming power from the power source as the power consumption of the plurality of computing devices decreases during a time that the power consumption profile indicates the power consumption of the plurality of computing devices will continue to decrease, and decreasing the number of computing devices in the IT stack that are consuming power from the power source as the power consumption of the plurality of computing devices increases during a time that the power consumption profile indicates the power consumption of the plurality of computing devices will continue to increases.

15. The method of claim 13, further comprising predicting an upcoming change in power consumption by the plurality of computing devices based on the power consumption profile, wherein adjusting the performance of devices consuming power begins prior to a time at which the upcoming change is predicted to start.

16. The method of claim 13, further comprising:
    decreasing performance of the plurality of computing devices in response to a determination that a present consumption level of the plurality of computing devices is above a first threshold; and increasing performance of the plurality of computing devices in response to a determination that the present consumption level of the plurality of computing devices is below a second threshold.

17. The method of claim 13, wherein the power source is a fuel cell.

18. The method of claim 13, wherein the power consumption profile comprises a total power consumption level of the IT stack and a respective individual power consumption level for each respective computing device.

19. The method of claim 13, wherein:

increasing the performance of the plurality of computing devices comprises adding additional workload to at least some of the plurality of computing devices in the IT stack, wherein adding additional workload comprises adding to the computing devices jobs that are ranked at a lower priority than jobs currently being performed by the plurality of computing devices; and decreasing the performance of the plurality of computing devices comprises removing workload from at least some of the plurality of computing devices in the IT stack, wherein workload comprises removing from the computing devices jobs that currently being performed by the plurality of computing devices and that are ranked at a lower priority than other jobs currently being performed by the plurality of computing devices.

20. The method of claim 13, wherein increasing the performance of the plurality of computing devices comprises increasing a clock speed of at least some of the plurality of computing devices in the IT stack.

21. The method of claim 13, further comprising:

increasing, by the power controller, an operating level of an ancillary cooling system when the power consumption of the plurality of computing devices decreases; and decreasing, by the power controller, an operating level of the ancillary cooling system when the power consumption of the plurality of computing devices increases.

22. The method of claim 13, further comprising:

monitoring, by the power controller, characteristics of a fuel source of the power source;

generating, by the power controller and based on the monitored characteristics of the fuel source, a historical supply profile of the fuel source;

determining, by the power controller, that a source anomaly of the fuel source or a backup power feed is occurring or will occur at a given time; and adjusting, by the power controller, the power consumption of the IT stack based on the source anomaly.

23. The method of claim 22, wherein determining that the source anomaly of the fuel source or a backup power feed is occurring or will occur at a given time comprises determining that the level of the fuel source is below a power source threshold.

24. The method of claim 22, wherein the power source is a fuel cell, and monitoring characteristics of the fuel source comprises monitoring a level of natural gas being provided to the fuel cell.

* * * * *